United States Patent [19]

Cavalli

[11] 4,392,361
[45] Jul. 12, 1983

[54] SELF-CONTAINED ICE CREAM APPARATUS

[76] Inventor: Alfredo Cavalli, Via Galileo Galilei 9, Pessano Con Bornago (Milano), Italy

[21] Appl. No.: 267,874

[22] Filed: May 28, 1981

[30] Foreign Application Priority Data

| | | |
|---|---|---|
| May 30, 1980 [IT] | Italy | 22480 A/80 |
| Jul. 10, 1980 [IT] | Italy | 23366 A/80 |
| Dec. 2, 1980 [IT] | Italy | 26354 A/80 |
| Jan. 19, 1981 [IT] | Italy | 19198 A/81 |

[51] Int. Cl.³ .............................................. A23G 9/00
[52] U.S. Cl. ...................................... 62/343; 366/309
[58] Field of Search ................. 62/342, 343; 366/309, 366/312

[56] References Cited

U.S. PATENT DOCUMENTS

| | | | |
|---|---|---|---|
| Re. 21,827 | 6/1941 | Erickson et al. | 62/343 |
| 1,717,478 | 6/1929 | Vilas | 366/309 |
| 2,746,730 | 5/1956 | Swenson et al. | 62/343 X |
| 2,779,167 | 1/1957 | Lo Faro | 62/343 |
| 3,284,059 | 11/1966 | Troy | 366/312 |
| 3,400,551 | 9/1968 | Booth et al. | 62/343 X |
| 3,914,956 | 10/1975 | Knight, Jr. | 62/343 |
| 3,958,968 | 5/1976 | Hosaka | 62/343 |
| 4,241,590 | 12/1980 | Martineau | 62/343 |

*Primary Examiner*—William E. Tapolcai
*Attorney, Agent, or Firm*—Hubbell, Cohen, Stiefel & Gross

[57] ABSTRACT

A self-contained apparatus (20, 100, 200) for making an ice cream type mixture includes a mixing chamber or container (22, 103, 222) which is controllably cooled by a refrigeration unit (50, 50', 50") including a coil (52, 52', 52") surrounding the container (22, 103, 222). A blade (32-36, 105, 208-209) such as a flexible blade, is rotatably driven in the container (22, 103, 222) by a motor (28, 28', 28") and may preferably include an angled multifunction blade (32) and a scraper blade (36). The multifunction blade (32) primarily performs three functions of forcing the mixture contents downwardly toward the base wall (33) and forcing these contents outwardly from the center (26) toward the side wall (35) and kneading the ingredients while the scraper blade (36) forces those contents upwardly from the base wall (33) and from the side wall (35) toward the center (26) thereby cyclically intermixing the warmer and colder contents and providing a substantially uniform temperature gradient for the mixture. The base wall (233) of the chamber (222) may also include protruding ribs (207) which cooperate with the flexible blade (209) to crush or shred fruit added to the mixture. The apparatus (100) may also include a heater coil 106 surrounding the container 103 for selectively heating the contents to be mixed instead of refrigerating them, as well as a separate container (107) and blade 109 for blending vegetables with the blade 109 being selectively driven by the same motor (28') which drives the blade (105) associated with the other container (103).

45 Claims, 20 Drawing Figures

SELF-CONTAINED ICE CREAM APPARATUS

The present invention relates to apparatus for making ice cream type mixtures, and particularly to self-contained apparatus of this type capable of household use such as for providing a substantially uniform temperature gradient for the resultant ice cream mixture or for accomplishing heating of liquids and/or blending of vegetables as well in a common apparatus.

BACKGROUND ART

Prior art ice cream machines for household use are well known, such as manufactured by Salton and others. However, these prior art machines known to applicant are not satisfactory in that they are not self-contained and require the use of some type of separate or external refrigeration such as dry ice or actual placement in the freezer compartment of a refrigerator until the final product becomes frozen. In addition such prior art ice cream machines do not provide a substantially uniform temperature gradient throughout the ice cream mixture during mixing with the outermost portions of the mixture, which are normally closest to the refrigerated container walls, being colder than the center of the mixture, often by as much as 20 degrees centigrade. This produces an unsatisfactory ice cream product. Moreover, because of this, ice tends to form on the walls of the container which must be scraped off by hard non-flexible blades driven by a high horsepower motor, which high horsepower would not otherwise be required.

Apart from the above, applicant is not aware of any such prior art machines capable of both making ice cream and heating liquid foods, such as puddings, or of also blending vegetables in a single efficient machine.

These disadvantages of the prior art are overcome by the present invention.

DISCLOSURE OF THE INVENTION

It should be noted that as used throughout the specification and claims, the term "ice cream" or "ice cream type mixture" is meant to include not only hard and soft ice cream per se, but is also meant to include sherbet and ices and other food products of this nature.

With this in mind, a self-contained apparatus for making an ice cream type mixture from a plurality of ingredients therefor is provided in which a mixing chamber for mixing the ingredients therein is controllably cooled by a refrigeration means, such as a refrigeration coil surrounding the chamber. A blade means is rotatably driven within the chamber to mix the ingredients with the blade means comprising means for scraping the ingredients from the side and base walls of the container to move the colder ice cream from the base wall toward the top and from the side wall toward the center, for forcing the ingredients downwardly away from the top toward the base wall of the container and for forcing the ingredients from the center toward the side wall to move the warmer ice cream toward the colder area while stiring and intermixing the ingredients throughout the chamber, and working and kneading the ice cream mixture whereby a substantially uniform temperature gradient for the resultant ice cream mixture is provided. The blade means is preferably flexible and may comprise a multifunction blade which primarily mixes and works the ingredients while moving the warmer ice cream mixture from the top to the base and from the center to the side and another blade whose primary function is to scrape the base and side walls while moving the colder ice cream mixture from the base to the top and from the side to the center. The multifunction mixing blade is preferably angled in two intersecting planes with respect to the base wall of the mixing chamber for providing the aforementioned stirring and intermixing functions. If desired, the blade can be curved to provide the desired angular relationships. The scraping blade is also preferably angled to assist in conveying the ingredients from the side toward the center.

In addition, if desired, the container for the ingredients, along with the blade means, may be removable, with the refrigeration coil being seated in a receptacle for the container. In addition, an immersion type heating coil can also be seated in this receptacle so as to enable selection of either the heating or refrigeration function for the contents being mixed in the removable container. Furthermore, a separate container and blending blade for vegetables can also be provided in the same device with the blending blade being selectively driven by the same motor which is used to drive the aforementioned multifunction mixing blade.

Furthermore, in order to enhance the ability of the self-contained apparatus for making an ice cream type mixture to produce fruit ice cream or similar products, protruding radial ribs may be provided on the bottom or base wall of the refrigerated mixing chamber for cooperation with the flexible mixing blade. In such instance the mixing blade is preferably convex in its direction of advance or rotation through the mixing chamber. Thus, pieces of fruit or other soft type material added to the base ingredients of the ice cream mixture can be crushed and depulped by the mixing blade against the ribs and readily intermixed with the other ingredients.

BEST MODE FOR CARRYING OUT THE INVENTION

Figure 1:
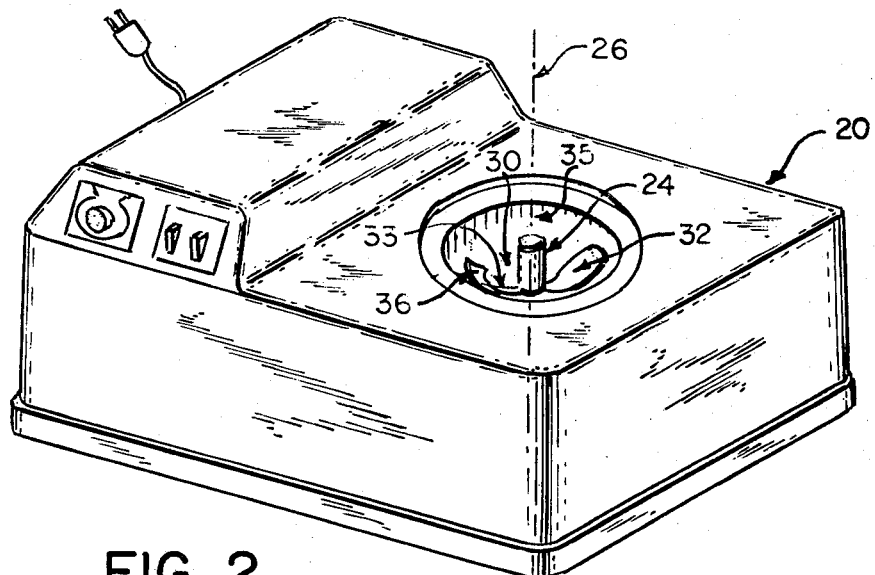
FIG. 1 is a front perspective view of a preferred embodiment of the apparatus of the present invention with the cover removed.
Figure 2:
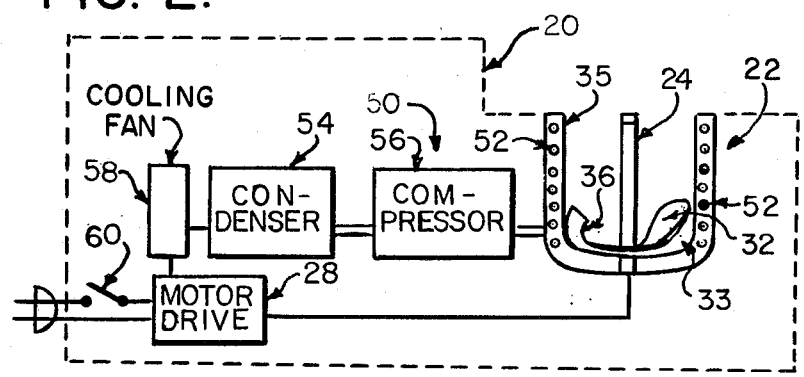
FIG. 2 is a functional block diagram, partially diagrammatic, of the apparatus of FIG. 1.

Referring now to the drawings in detail, and initially to FIGS. 1 and 2, a preferred embodiment of the self-contained apparatus 20 of the present invention for making ice cream type mixtures from a plurality of ingredients therefor is shown. The apparatus 20 preferably includes a mixing chamber for the ingredients. For purposes of illustration the mixing chamber 22 shall be assumed to be capable of making a quart of ice cream. In such an instance, for a device 20 whose overall box dimensions are 12¼ by 18⅞ by 9⅞ inches, by way of example, the mixing chamber 22, which is preferably cylindrical in shape, could have a diameter of 7⅛ inches and a height of 3⅝ inches, by way of example. A shaft 24 is preferably located along the longitudinal or central axis 26 of the chamber 22 and is preferably rotatably driven within the chamber 22 by a conventional low horsepower motor 28, such as a 0.088 HP motor, through conventional gearing.

As shown and preferred in FIG. 1 a blade arrangement 30 is preferably keyed to the shaft 24 to be rotatably driven with the shaft 24, with the blade arrangement 30 preferably being removably mountable on the shaft 24 to facilitate cleaning and changing if desired.

Figure 18:
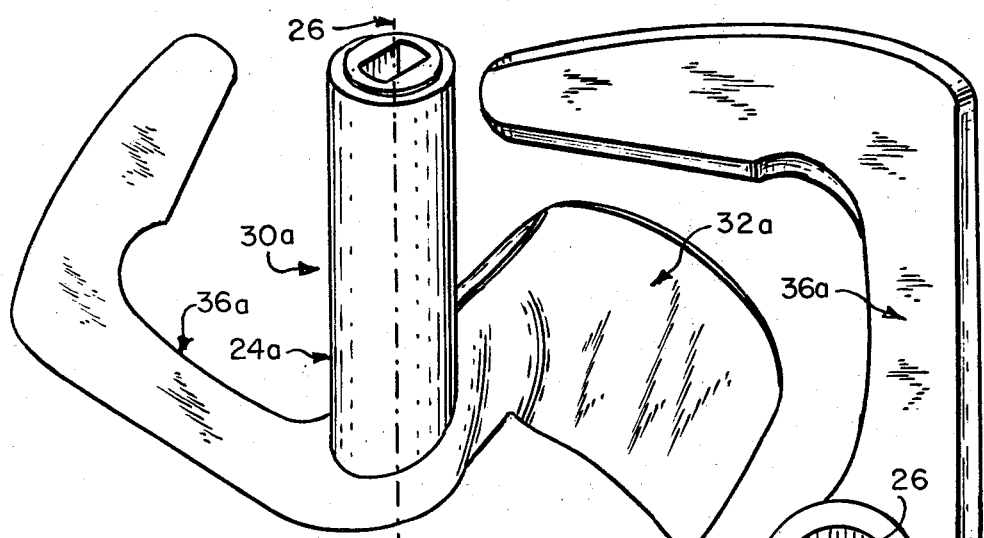
FIG. 18 is a perspective view of another presently preferred embodiment of the improved blade of FIGS. 5-8.
Figure 19:
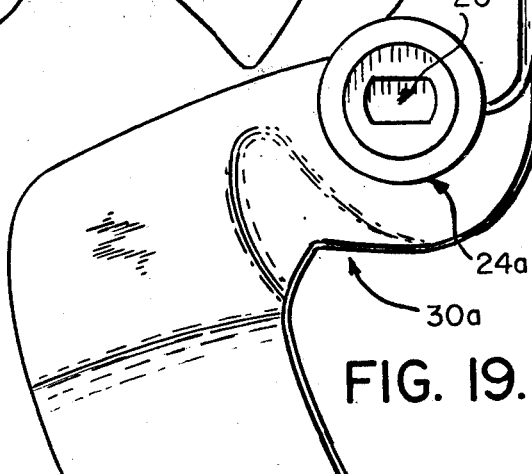
FIG. 19 is a plan view of the improved blade of FIG. 18.
Figure 20:
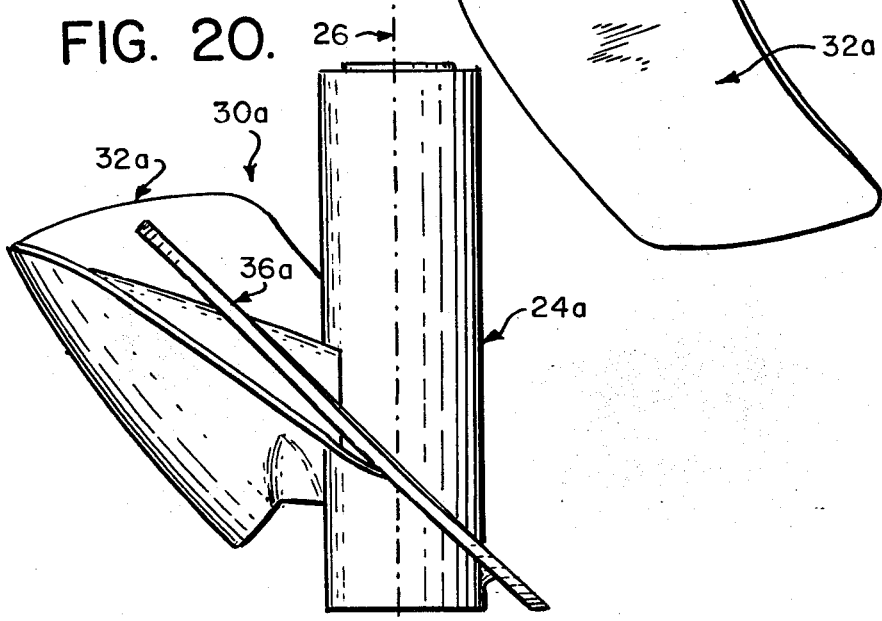
FIG. 20 is a side view, from the left side, of the blade of FIG. 18.

The blade arrangement 30 is shown in greater detail in FIGS. 5-8, as well as in the arrangement 30a of FIGS. 18-20, and preferably consists of a multifunction blade 32 and a scraper blade 36. The multifunction blade 32 preferably performs the three functions of forcing the ice cream mixture to flow downwardly from the top of the container 22 toward the base wall 33 of the container or chamber 22, forcing the ice cream mixture to flow from the central axis 26 outwardly toward the side wall 35, and working and kneading the ice cream mixture. In addition, the multifunction blade 32 may provide a slight scraping of the side wall 35 as the blade 32 rotates. The primary purpose of the scraper blade 36 is to scrape the base and side walls 33 and 35, respectively, as the blade arrangement 30 rotates. As shown and preferred in FIG. 8, blades 32 and 36 are substantially 180 degrees apart in the direction of rotation indicated by arrows 40. Although two blades 32 and 36 are shown and presently preferred in FIGS. 1, 2 and 5-8, if desired the scraping blade 36 may be omitted. However, most preferably, both side blades 32 and 36 are employed and may be formed or molded as a single piece as shown in the presently most preferred arrangement 30a of FIGS. 18-20. Moreover, although a single blade 32 is shown and presently preferred for the multifunction blade 32, these three functions, if desired, can be performed by separate blades. In addition, preferably the blades 32 and 36 are formed of a flexible material, such as Nylon, which helps compensate for irregularities in the shape of the container 22 both structurally and due to any icing which may occur, as well as assisting in the stirring or intermixing action caused by the rotation of the multifunction blade 32. If desired, the multifunction blade 32 could be non-flexible, such as formed of a metal, however, such an arrangement is less preferable in that the formation of ice on the side wall 35 could stop the blade 32 from rotating.

Figure 5:
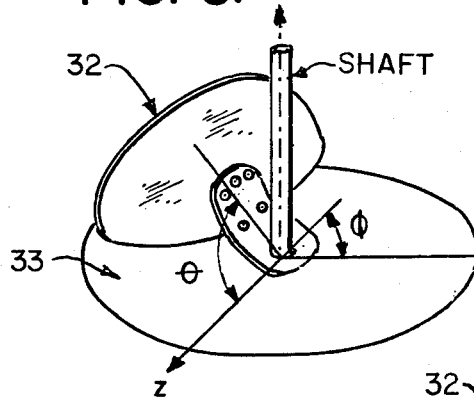
FIG. 5 is a fragmentary diagrammatic illustration, partially in perspective, of the angular relationship between the improved blade of the present invention and the base wall of the mixing chamber.
Figure 6:
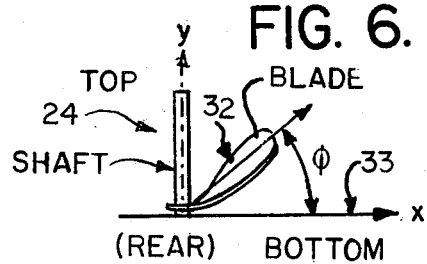
FIG. 6 is a rear view of the blade of FIG. 5 diagrammatically illustrating the angular relationship of the blade in the X-Y plane of FIG. 5.
Figure 7:
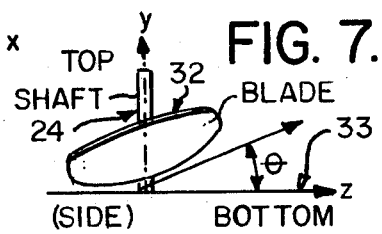
FIG. 7 is a side view, similar to FIG. 6, of the blade of FIG. 5 diagrammatically illustrating the angular relationship of the blade in the Y-Z plane of FIG. 5.
Figure 8:
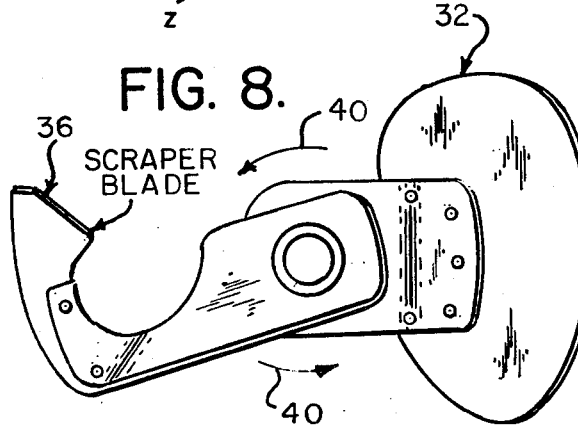
FIG. 8 is a plan view of a presently preferred embodiment of the blade of FIGS. 5-7.

As shown and preferred in FIGS. 5-8, the multifunction blade 32, which is preferably flexible, is angled in two intersecting planes, X-Y and Y-Z, with respect to the base wall 33 of the container 22 so as the enable the stirring or intermixing functions of forcing the ice cream mixture to flow from the top downwardly toward the base wall 33 and from the central axis 26 outwardly toward the side wall 35. FIG. 6 illustrates the angle $\phi$ of the multifunction blade 32 in the X-Y plane, whereas FIG. 7 illustrates the angle $\phi$ of the multifunction blade 32 in the Y-Z plane, with FIG. 5 illustrating this angular relationship in three dimensions. It has presently been found that the value of these angles $\phi$ and $\theta$ is not critical as long as an angular relationship exists in the X-Y and Y-Z planes. However, as presently preferred, these angles are $\phi$ approximately equal to 40 degrees and $\theta$ approximately equal to 50 degrees. In addition, as shown and presently preferred, the multifunction blade 32 is curved but such curve is unnecessary as long as the angles $\phi$ and $\theta$ are present for the blade 32 surfaces in the X-Y and Y-Z planes, respectively. In addition, the scraping blade 36 is also preferably angled with respect to the base wall 33, such as at an angle of substantially 45 degrees, so as to assist in conveying the ingredients toward the central axis 26, as shown in FIG. 20 for blade 36a.

Referring once again to FIGS. 1-3, the apparatus 20 also preferably includes a self-contained refrigeration unit 50 for refrigerating or cooling the interior of the container or chamber 22. The refrigeration unit 50 preferably comprises a refrigeration coil 52 through which conventional refrigerating fluid is circulated by means of a conventional compressor 54 and condensor-exchanger 56 such as one employing Freon 12, having a cooling fan 58 which is driven by the motor 28. A cover, not shown, may be provided for the container 22 to close the container 22 during the mixing operation.

With respect to FIGS. 18-20, the presently most preferred blade arrangement 30a is shown wherein the multifunction blade 32a, scraping blad 36a and shaft 24a are essentially formed from a unitary piece, each as Nylon. The function and operation of the blade arrangement 30a is essentially the same as that for the blade arrangement 30 of FIGS. 5-8 and, therefore, need not be separately described in any greater detail.

Figure 3:
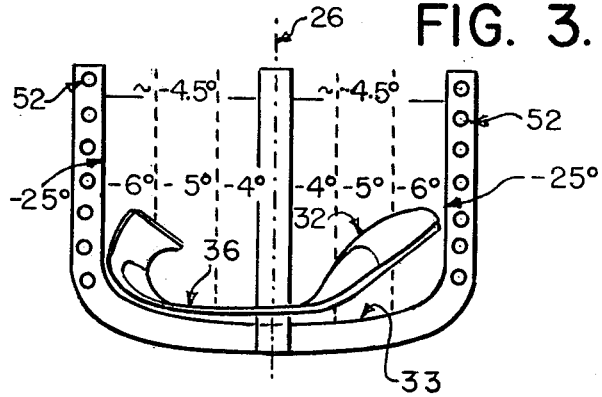
FIG. 3 is a diagrammatic illustration of the mixing chamber of the apparatus of FIG. 1 illustrating an exemplary temperature gradient therein.
Figure 4:
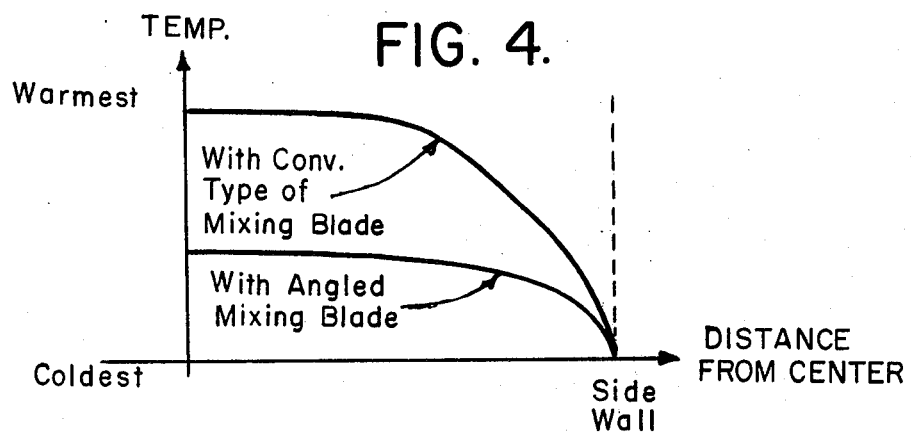
FIG. 4 is a graphic illustration of the temperature gradient present in the mixing chamber of FIG. 3 with and without the improved blade of the present invention.
Figure 9:
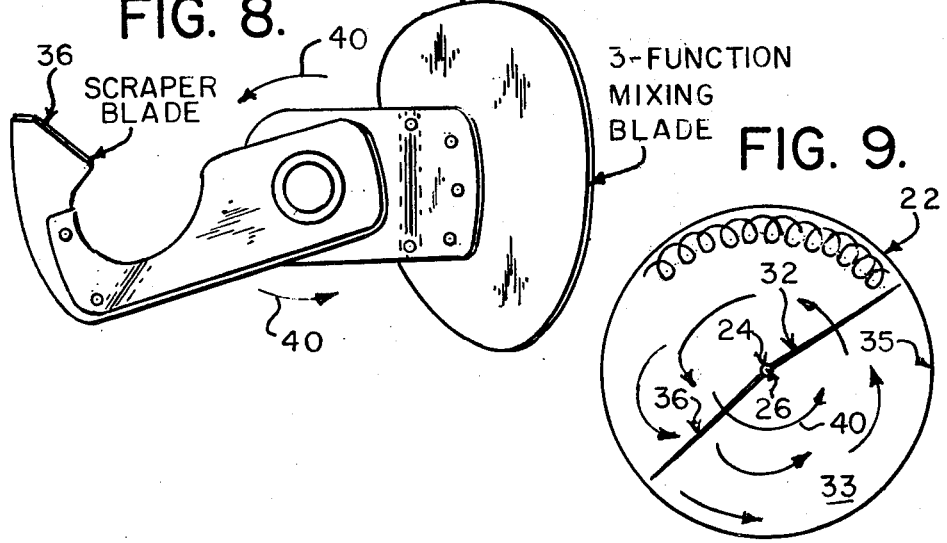
FIG. 9 is a diagrammatic illustration of the swirling and scraping action of the improved blade of the present invention.

Referring now to FIGS. 3, 4 and 9 the general operation of the apparatus 20 of FIG. 1 will be described. The desired ingredients for making the ice cream type mixture, such as cream, sugar and flavoring in appropriate proportions, are added to the container 22. The apparatus 20, which is preferably A.C. usinng an A.C. motor 28, and which is assumed to be connected to an A.C. power source, is then turned on by closure of a switch 60 thereby turning the motor 28 on. This both turns on the refrigeration unit 50 and rotatably drives the blade arrangement 32–36 keyed to the shaft 24. The interior of the container 22 is then cooled by the refrigeration coil 52 with the side wall 35 preferably attaining a temperature on the order of −25° C. As the blade arrangement 32–36 continues to rotate, the bottom and side walls 33 and 35, respectively, are scraped by scraper blade 36 as the ingredients are stirred and cooled or refrigerated. Flexible blade 32 also elastically rubs against the sidewall 35 as the blade 32 rotates. In addition, however, blade 32 continually causes a swirling type action to occur since the stirred ingredients are continually intermixed as illustrated in FIG. 9, with the ingredients disposed toward the top being forced to flow downwardly toward the bottom or base wall and with the ingredients disposed toward the central axis 26 being forced to flow outwardly toward the side wall 35. In addition, blade 32 is working and kneading the mixture. At the same time, the scraper blade 36 is forcing the ingredients from the bottom 33 toward the top and from the side wall 35 toward the center 26. Consequently, blade 32 helps move the warmer portions of the mixture toward the colder areas while blade 36 helps move the colder portions of the mixture toward the warmer areas. Thus, during each cycle of revolution of blades 32 and 36, the contents of the mixture are turned over and intermixed, substantially resulting in a balancing out or averaging of the temperature of the refrigerated mixture so as to provide a substantially uniform temperature gradient, such as the −4° C. to −6° C. gradient illustrated in FIG. 3. Without this type of cyclical intermixing caused by the angled blades 32 and 36, the temperature gradient would be much more dramatic, as illustrated in FIG. 4, and would enable ice crystals to readily form on the side wall 35, as the ice cream mixture solidified. When the ice cream mixture has achieved the desired consistency and solidification, the motor 28 is turned off and the ice cream is finished and ready to be eaten, if desired, without any additional refrigeration.

Figure 10:
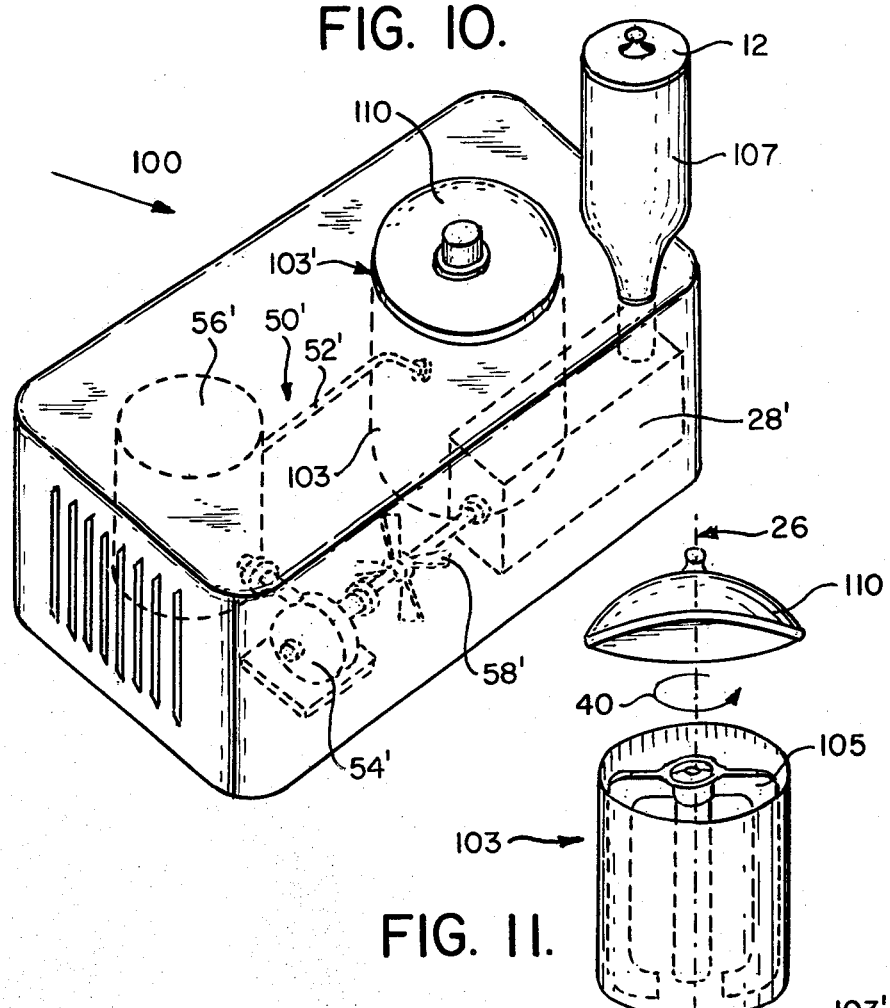
FIG. 10 is a perspective view, partially diagrammatic, of a preferred alternative embodiment of the apparatus of FIG. 1.
Figure 11:
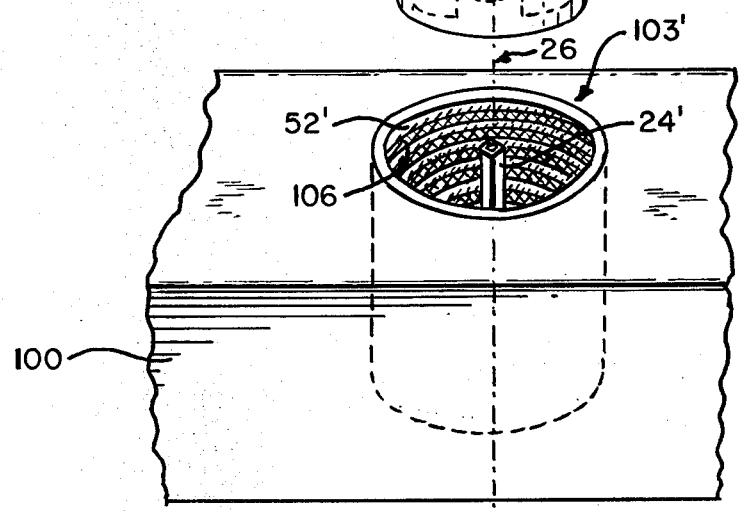
FIG. 11 is a fragmentary exploded perspective view, partially diagrammatic, of the container, blade and container receptacle portions of the apparatus of FIG. 10.
Figure 12:
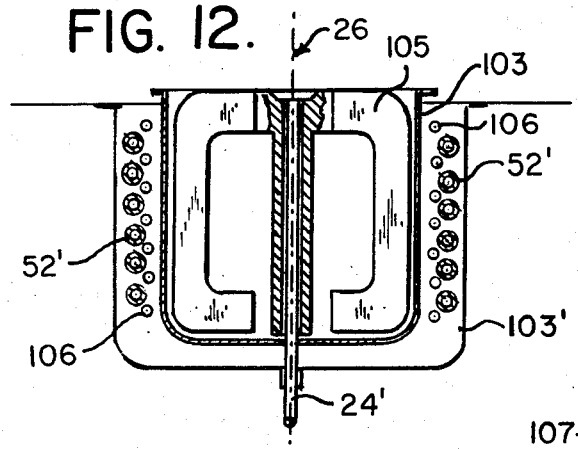
FIG. 12 is an enlarged fragmentary sectional view of the seated container of FIG. 11.

Referring now to FIGS. 10–13, an alternative embodiment of the present invention, generally referred to by the reference numeral 100, is shown. As shown and preferred in FIGS. 1–13, whereas the apparatus 20 of FIGS. 1–9 is essentially solely a device for making ice cream type mixtures, the apparatus 100 of FIGS. 10–13 is preferably capable of also heating liquids placed within the container 103 and of blending vegetables in a separate container 107, as will be described in greater detail hereinafter. Furthermore, as shown and preferred in FIGS. 10–13, the container 103 and 107 are preferably removable from the apparatus 100. Of course, if desired, container 22 may be similarly made removable from the apparatus 20 of FIGS. 1–9. The refrigeration unit 50' portion of the apparatus 100 of FIGS. 10–13 is essentially the same, as the refrigeration unit 50 of the apparatus 10 of FIGS. 1–9, including motor 28'; compressor 54'; condensor 56'; fan 58'; and coil 52'; with the exception that the coil 52' is located within a receptacle or seat 103' for the removable container 103. Although the blade arrangement 30 of FIGS. 1–9 is preferably employed, if desired another mixing blade arrangement 105 may also be employed, with the blade 105 again being keyed to the shaft 24'. As further shown and preferred in FIGS. 11–12, the receptacle 103' is also preferably provided with an immersion-type heating coil 106 whose turns preferably alternate with the turns of the refrigeration coil 52'. A separate switch may be provided for selecting between supplying power to the refrigeration unit 50' or to the heater coil 106, depending on whether the user wishes to refrigerate or heat the contents of the container 103. In either instance, preferably the motor 28' is ued to rotatably drive the shaft and blade combination 24'–105 to air the contents of the container 103 which, as shown in FIGS. 10–11, may be closed by a lid 110.

Figure 13:
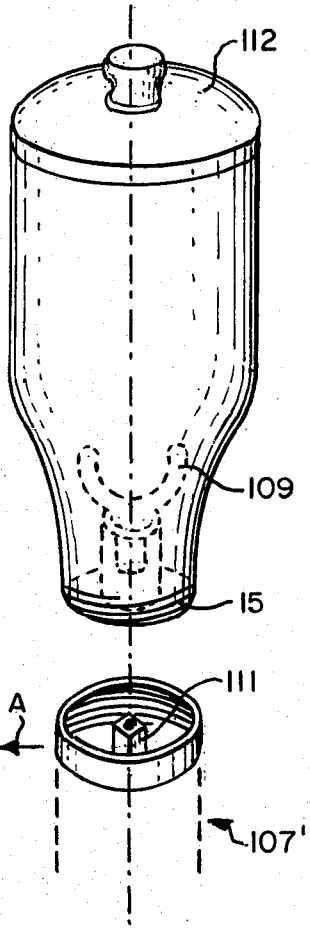
FIG. 13 is an enlarged exploded fragmentary perspective view, partially diagrammatic, of the vegetable blender portion of the apparatus of FIG. 10.
Figure 15:
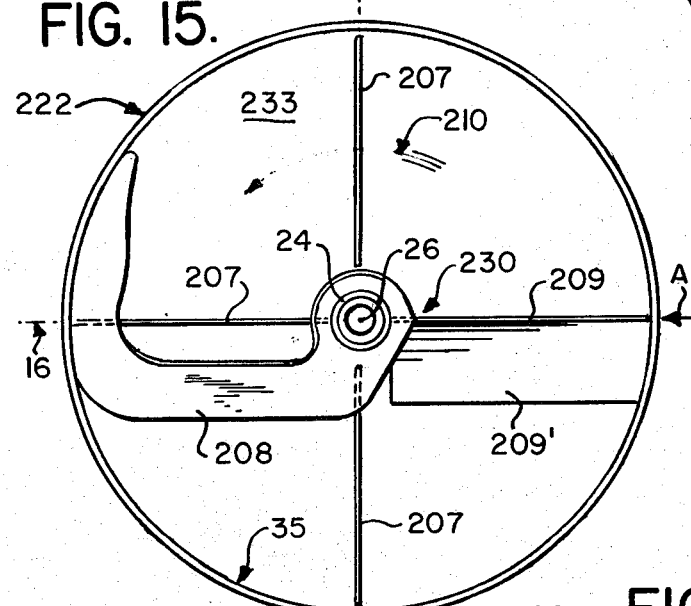
FIG. 15 is an enlarged fragmentary top plan view of the mixing chamber of the apparatus of FIG. 14.
Figure 14:
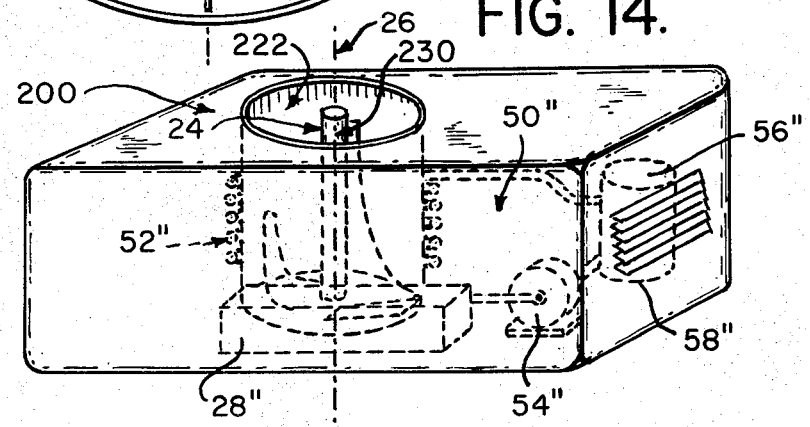
FIG. 14 is a perspective view, partially diagrammatic, of another preferred alternative embodiment of the apparatus of FIG. 1.
Figure 16:
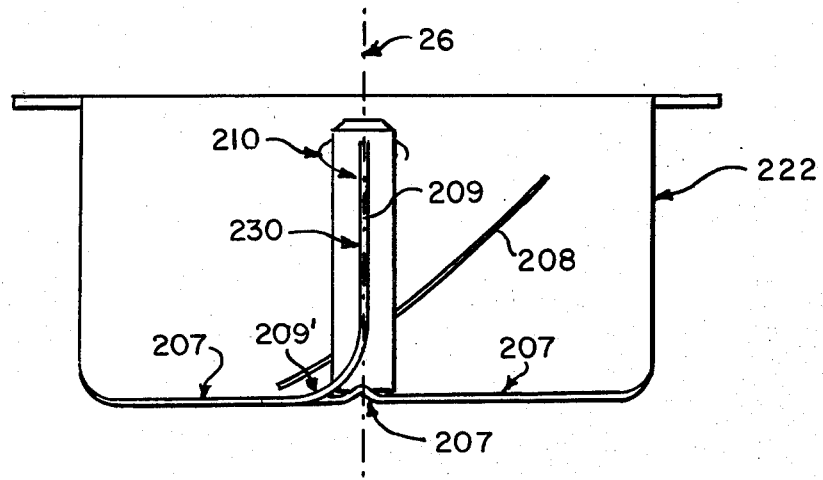
FIG. 16 is an enlarged fragmentary sectional view of the mixing chamber of FIG. 15 taken along line 16—16 in FIG. 15.
Figure 17:
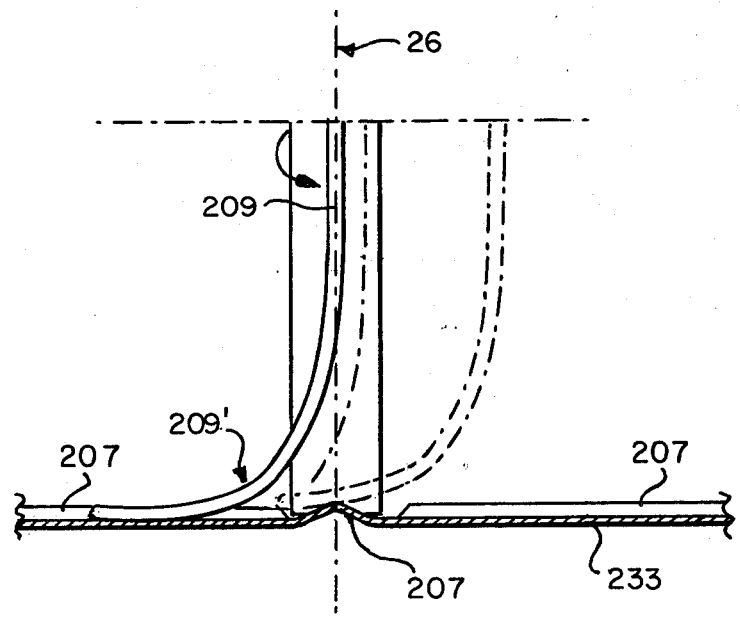
FIG. 17 is an enlarged fragmentary diagrammatic illustration of the relationship between the mixing blade and the bottom or base wall of the mixing chamber of the apparatus of FIG. 1.

In addition, as shown in FIGS. 11 and 13, container 107, having a removable cover 112, may be threadably mounted on to a seat 107' on the apparatus 100. A blade 109 for blending vegetables may preferably be mounted or keyed to another shaft 111 to be rotatably driven thereby and is rotatably mounted within container 107. The shaft 111 is preferably geared to motor 28' to be rotatably driven thereby to blend vegetables placed in container 107. If desired, appropriate switching may be provided to select between drive of shaft 111 and shaft 24, as well as between coil 52' and coil 106. Thus, a common apparatus 100 enables ice cream type mixtures to be made, heated mixtures to be made and vegatables to be blended in an efficient and economical way.

Referring now to FIGS. 14–17 another alternative embodiment of the apparatus 20 of the present invention, generally referred to by the reference numeral 200, is shown. As will be described in greater detail hereinafter, the apparatus 200 of FIGS. 14–17 enhances the ability of the apparatus 20 of the present invention in making fruit ice creams or other similar types of ice cream in which pieces of fruit or other soft material are to be crushed or shredded and depulped and amalgamated or intermixed with the other essential ingredients of the ice cream mixture, such as in making sorbet. The refrigeration unit 50" of the apparatus 200 of FIGS. 14–17 is preferably essentially the same as the refrigeration unit 50 of the apparatus 10 of FIGS. 1–9 including motor 28" compressor 54", condensor 56", cooling fan 58", and coil 52", and includes a mixing chamber 222 which essentially differs from mixing chamber 22 in that the base wall 233 or bottom of the mixing chamber 222 includes a plurality of radial protruding ribs 207, with four such ribs being shown by way of example spaced apart by 90 degrees. The protruding ribs 207 may be employed with the blade arrangement 30 of FIGS. 1–9 if desired or by way of example, with the blade arrangement 230, illustrated in FIGS. 14–17, or the chamber 22 of the apparatus 10 may be provided with such ribs 207 in the base wall 33. In either instance, as will be explained in greater detail hereinafter, the purpose of the protruding ribs 207 is to cooperate with the lower end of the mixing blade 32 or 209 portion of the respective blade arrangements 30 or 230 during its rotation about central axis 26 so as to crush and depulp and fruit or soft material ingredients added to the ice cream mixture during the formation of the ice cream.

With respect to the blade arrangement 230 illustrated in FIGS. 14–17, it preferably comprises a scraping blade 208 for scraping the side wall 35 of the mixing chamber 222 as well as providing some assistance in mixing the ingredients as it rotates, and a flexible mixing blade 209 which preferably intermixes the ingredients, cooperates with the ribs 207 to crush and depulp any fruit or soft material added to the mixture and scrapes the side wall 35 during its rotation. The lower end 209' of the flexible mixing blade 209 is preferably convex in its direction of advance or rotation indicated by arrow 210, with this end 209' preferably being elastically or resiliently pressed toward the base wall 233 or bottom of the mixing chamber 222 such as due to mixing blade 109 being formed from a flexible or elastically deformable material. In this regard, with blade 230 mounted on or keyed to the shaft 24, as the blade 230 rotates under the drive of the motor 28", as the lower end 209' of the mixing blade 209 passes over the protruding ribs 207 (FIG. 17) it cooperates with the ribs 207 to crush and depulp or shread the pieces of fruit so that they can be readily amalgamated and intermixed with the base ingredients as the mixing blade 209 continues to rotate. Of course, the above operation is further facilitated by cutting the fruit into small pieces prior to adding it to the mixture. In addition, of course, if desired blade 230 may be removably mountable on the shaft 24 to facilitate cleaning or replacement and may be formed from a single blade or several blades.

It is to be understood that the above described embodiments of the invention are merely illustrative of the principles thereof and that numerous modifications and embodiments of the invention may be derived within the spirit and scope thereof.

What is claimed is:

1. A self contained apparatus for making an ice cream type mixture from a plurality of ingredients therefor comprising a mixing chamber having a base wall and a side wall with respect thereto, refrigeration means for controllably cooling the interior of said chamber, blade means rotatably mountable in said mixing chamber for rotation about an axis of said chamber, and means for controllably rotatably driving said blade means within said chamber about said axis, said blade means comprising means for scraping said side and base walls for forcing said ingredients from said side wall toward said axis and upwardly away from said base wall and for forcing said ingredients from said axis toward said side wall and downwardly toward said base wall as said blade means rotates about said axis for stirring and intermixing said ice cream ingredients throughout said chamber interior, said blade means being configured and disposed for substantially continually transporting the warmer portions of the mixture toward the colder areas thereof and the colder portions of the mixture toward the warmer areas thereof during the rotation of said blade means for providing a substantially uniform temperature gradient for substantially the entire resultant ice cream mixture.

2. An apparatus in accordance with claim 1 wherein said mixing chamber is substantially defined by a surface of revolution.

3. An apparatus in accordance with claim 2 wherein said refrigeration means comprises a refrigeration coil substantially surrounding said chamber.

4. An apparatus in accordance with claim 3 wherein said refrigeration means further comprises condensor means associated with said refrigeration coil.

5. An apparatus in accordance with claim 4 wherein said refrigeration means further comprises compressor means associated with said condensor and refrigeration coil means.

6. An apparatus in accordance with claim 3 wherein said rotatably mounted blade means comprises mixing means angled in two intersecting planes with respect to the base wall of said mixing chamber for providing said stirring and intermixing of said ice cream ingredients as said angled mixing means rotate about the axis of said chamber.

7. An apparatus in accordance with claim 6 wherein said angled mixing means comprises a first blade capable of both kneading and stirring and intermixing said ice cream ingredients.

8. An apparatus in accordance with claim 7 wherein said blade means further comprises a second blade capable of scraping said side and base walls.

9. An apparatus in accordance with claim 8 wherein said second blade is angled with respect to said base wall.

10. An apparatus in accordance with claim 8 wherein said second blade is rotatably mounted substantially 180° apart from said first blade in the direction of rotation of said blade means about the axis of said mixing chamber.

11. An apparatus in accordance with claim 10 wherein said blade means comprises flexible blade means.

12. An apparatus in accordance with claim 11 wherein said first blade is a flexible blade.

13. An apparatus in accordance with claim 12 wherein said rotating blade means provide a swirling action during the mixing of said ice cream ingredients for substantially turning over said ice cream mixture within said mixing chamber by substantially continually intermixing the bottom, top, inner and outer portions of said mixture together as said blade means rotates about said axis.

14. An apparatus in accordance with claim 1 wherein said refrigeration means comprises a refrigeration coil substantially surrounding said chamber.

15. An apparatus in accordance with claim 1 wherein said rotatably mounted blade means comprises mixing means angled in two intersecting planes with respect to the base wall of said mixing chamber for providing said stirring and intermixing of said ice cream ingredients as said angled mixing means rotate about the axis of said chamber.

16. An apparatus in accordance with claim 15 wherein said angled mixing means comprises a first blade capable of both kneading and stirring and intermixing said ice cream ingredients.

17. An apparatus in accordance with claim 16 wherein said blade means further comprises a second blade capble of scraping said side and base walls.

18. An apparatus in accordance with claim 17 wherein said second blade is rotatably mounted substantially 180° apart from said first blade in the direction of rotation of said blade means about the axis of said mixing chamber.

19. An apparatus in accordance with claim 1 wherein said blade means comprises flexible blade means.

20. An apparatus in accordance with claim 15 wherein said mixing means comprises flexible blade means.

21. An apparatus in accordance with claim 1 wherein said rotating blade means provides a swirling action during the mixing of said ice cream ingredients for substantially turning over said ice cream mixture within said mixing chamber by substantially continually intermixing the bottom, top, inner and outer portions of said mixture together as said blade means rotates about said axis.

22. An apparatus in accordance with claim 15 wherein said rotating mixing means provides a swirling action during the mixing of said ice cream ingredients for substantially turning over said ice cream mixture within said mixing chamber by substantially continually intermixing the bottom, top, inner and outer portions of said mixture together as said blade means rotates about said axis.

23. An apparatus in accordance with claim 1 wherein said chamber axis is the longitudinal axis thereof.

24. An apparatus in accordance with claim 1 wherein said apparatus comprises a self-contained portable household type apparatus.

25. An apparatus in accordance with claim 24 wherein said means for rotatably driving said blade means comprises a relatively low horsepower motor.

26. An apparatus in accordance with claim 25 wherein said motor has a horsepower less than 1.0.

27. An apparatus in accordance with claim 26 wherein said blade means is assymmetrical about said axis.

28. An apparatus in accordance with claim 1 wherein said means for rotatably driving said blade means comprises a relatively low horsepower motor.

29. An apparatus in accordance with claim 28 wherein said motor has a horsepower less than 1.0.

30. An apparatus in accordance with claim 1 wherein said blade means is assymmetrical about said axis.

31. A self-contained apparatus for making an ice cream type mixture from a plurality of ingredients therefor comprising a mixing chamber having a base wall and a side wall with respect thereto, refrigeration means for controllably cooling the interior of said chamber, blade means mountable in said mixing chamber for relative rotation between said blade means and said mixing chamber about the axis of said chamber, and means for controllably causing said relative rotation between said blade and said chamber about said chamber axis, said blade means comprising means for scraping said side and base walls for forcing said ingredients from said side wall toward said axis and upwardly away from said base wall and for forcing said ingredients from said axis toward said side wall and downwardly toward said base wall as said relative rotation of said blade means about said axis occurs for stirring and intermixing said ice cream ingredients throughout said chamber interior, said blade means being configured and disposed for substantially continually transporting the warmer portions of the mixture toward the colder areas thereof and the colder portions of the mixture toward the warmer areas thereof during said relative rotation of said blade means for providing a substantially uniform temperature gradient for substantially the entire resultant ice cream mixture.

32. An apparatus in accordance with claim 31 wherein said mounted blade means comprises mixing means angled in two intersecting planes with respect to the base wall of said mixing chamber for providing said stirring and intermixing of said ice cream ingredients as said relative rotation between said angled mixing means and said chamber occurs about said chamber axis.

33. An apparatus in accordance with claim 32 wherein said angled mixing means comprises a first blade capable of both kneading and stirring and intermixing said ice cream ingredients.

34. An apparatus in accordance with claim 33 wherein said blade means further comprises a second blade capable of scraping said side and base walls.

35. An apparatus in accordance with claim 31 wherein said blade means provides a swirling action during the mixing of said ice cream ingredients for substantially turning over said ice cream mixture within said mixing chamber by substantially continually intermixing the bottom, top, inner and outer portions of said mixture together as said relative rotation between said blade means and said chamber about said chamber axis occurs.

36. An apparatus in accordance with claim 35 wherein said refrigeration means comprises a refrigeration coil substantially surrounding said chamber.

37. An apparatus in accordance with claim 31 wherein said refrigeration means comprises a refrigeration coil substantially surrounding said chamber.

38. An apparatus in accordance with claim 31 wherein said chamber axis is the longitudinal axis thereof.

39. An apparatus in accordance with claim 31 wherein said blade means comprises flexible blade means.

40. An apparatus in accordance with claim 31 wherein said apparatus comprises a self-contained portable household type apparatus.

41. An apparatus in accordance with claim 40 wherein said means for causing said relative rotation comprises a relatively low horsepower motor.

42. An apparatus in accordance with claim 41 wherein said motor has a horsepower less than 1.0.

43. An apparatus in accordance with claim 31 wherein said means for causing said relative rotation comprises a relatively low horsepower motor.

44. An apparatus in accordance with claim 43 wherein said motor has a horsepower less than 1.0.

45. An apparatus in accordance with claim 31 wherein said blade means is assymmetrical about said axis.

* * * * *